United States Patent [19]

Lutz et al.

[11] Patent Number: 4,816,530

[45] Date of Patent: Mar. 28, 1989

[54] POLYMER BLEND OF CARBON MONOXIDE/OLEFIN COPOLYMER AND A POLYACETAL POLYMER

[75] Inventors: Robert G. Lutz, Santa Rosa, Calif.; William P. Gergen, Houston, Tex.

[73] Assignee: Shell Oil Company, Houston, Tex.

[21] Appl. No.: 203,974

[22] Filed: Jun. 8, 1988

[51] Int. Cl.[4] ............................................. C08L 61/00
[52] U.S. Cl. ..................................... 525/472; 525/523; 525/539; 528/392
[58] Field of Search ................. 525/55, 153, 523, 539, 525/472; 528/392

[56] References Cited

U.S. PATENT DOCUMENTS

| | | | |
|---|---|---|---|
| 2,495,286 | 1/1950 | Brubaker | 260/63 |
| 2,947,727 | 8/1960 | Bartz | 260/67 |
| 2,947,728 | 8/1960 | Bartz | 260/67 |
| 3,027,352 | 3/1962 | Walling | 260/67 |
| 3,072,609 | 1/1963 | Barardinelli | 260/67 |
| 3,694,412 | 9/1972 | Nozaki | 260/63 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 222454 | 11/1987 | European Pat. Off. |
| 1081304 | 8/1965 | United Kingdom |

*Primary Examiner*—Harold D. Anderson
*Assistant Examiner*—T. Mason

[57] ABSTRACT

Improved impact resistance is exhibited by blends of (a) a linear alternating polymer of carbon monoxide and at least one ethylenically unsaturated hydrocarbon and (b) polyacetal polymer of at least 85 mole percent polymerized formaldehyde.

9 Claims, No Drawings

4,816,530

POLYMER BLEND OF CARBON MONOXIDE/OLEFIN COPOLYMER AND A POLYACETAL POLYMER

FIELD OF THE INVENTION

This invention relates to improved polymer blends comprising, as a major component, a linear alternating polymer of carbon monoxide and at least one ethylenically unsaturated hydrocarbon. More particularly, the invention relates to blends comprising the linear alternating polymer and, as a minor component, a polyacetal polymer.

BACKGROUND OF THE INVENTION

The class of polymers of carbon monoxide and olefin(s) has been known for a number of years. Brubaker, U.S. Pat. No. 2,495,286 produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium salts as catalyst. Nozaki extended the process to produce linear alternating polymers in the presence of arylphosphine complexes of palladium moieties and certain inert solvents. See, for example, U.S. Pat. No. 3,694,412.

More recently the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of the repeating formula —CO—(A)— where A is the moiety of unsaturated hydrocarbon polymerized through the ethylenic unsaturation. For example, when the hydrocarbon is ethylene, the polymer is represented by the repeating formula —CO—($CH_2$—$CH_2$)—. The general process for the more recent production of such polymers is illustrated by a number of published European patent applications including Nos. 0,121,965 and 0,181,014. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics hving established utility in the production of shaped articles such as containers for the food and drink industry and internal and external parts for the automotive industry. Such shaped parts are produced by processing the polyketone according to known methods. For some applications it has been found desirable to provide a polymer composition having properties somewhat different from those of the polyketone polymers. It would be of advantage to retain the more desirable properties of the polyketone polymer and yet improve other properties. This advantage is often obtained through the provision of a polymer blend.

SUMMARY OF THE INVENTION

The present invention contemplates the provision of blends of a linear alternating polymer of carbon monoxide and at least one ethylenically unsaturated hydrocarbon and certain other polymeric material. More particularly, according to the invention, there are provided non-miscible blends of the linear alternating polymer with a lesser proportion of a polyacetal, i.e., a polymer of formaldehyde optionally containing units of cyclic ether. Such blends exhibit improved properties of impact resistance and toughness as compared with the unblended polyketone polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon, particularly an $\alpha$-olefin of at least 3 carbon atoms such as propylene.

The structure of the polyketone polymer component of the blends of the invention is that of a linear alternating polymer of carbon monoxide and unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention, there will be within the terpolymer at least two units incorporating a moiety of ethylene for each unit incorporating a moiety of the second hydrocarbon, preferably from about 10 units to about 100 units incorporating a moiety of ethylene per unit incorporating a moiety of the second hydrocarbon. The polymer chain is therefore illustrated by the formula

$$\text{—[CO—(CH}_2\text{—CH}_2\text{)]}_x\text{[CO—(D)]}_y\text{—}$$

where D is the moiety obtained by polymerization of the second hydrocarbon through the ethylenic unsaturation. The —CO—($CH_2$—$CH_2$)— units and the —CO—(D)— units are found randomly throughout the polymer chain and the ratio of y:x is no more than about 0.5. In the modification where copolymers of carbon monoxide and ethylene are employed in the blends of the invention there will be no second hydrocarbon present in the polymer chain and the polymers are represented by the above formula wherein y=0. When y is other than 0, as in the case of terpolymers, ratios of y:x from about 0.01 to about 0.1 are preferred. The end groups or "caps" of the polymer chain will depend upon what materials are present during the production of the polymer and how and whether the polymer is purified. The precise nature of the end groups is of little significance with regard to the overall properties of the polymer so that the polyketone polymer is fairly represented by the above formula. Of particular interest are the polymers of a number average molecular weight from about 1,000 to about 200,000, preferably those of molecular weight from about 20,000 to about 90,000 as determined by gel permeation chromatography, containing substantially equimolar quantities of carbon monoxide and hydrocarbon. The physical properties of such polymers depend in part on the molecular weight of the polymer, whether the polymer is a copolymer or a terpolymer and the relative proportion of the second hydrocarbon present in the case of terpolymers. Typical melting points of such polymers are from about 175° C. to about 300° C., more frequently from about 210° C. to about 270° C.

A method of producing polyketone polymers which is now becoming conventional is to contact the carbon monoxide and unsaturated hydrocarbon(s) with a catalyst composition formed from a palladium compound, the anion of a non-hydrohalogenic acid having a pKa below about 6 and a bidentate phosphorus ligand. The scope of the process for polyketone production is substantial, and without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986.

Polymerization is conducted under polymerization conditions in the gaseous phase or in a liquid phase in the presence of a reaction diluent such as methanol or ethanol. The reactants and catalyst composition are contacted by conventional methods such as shaking or stirring in a suitable reaction vessel. Suitable reaction temperatures are from about 20° C. to about 150° C. with preferred temperatures being from about 50° C. to about 130° C. Typical reaction pressures are from about 1 bar to about 200 bar, more typically from about 10 bar to about 100 bar. Subsequent to reaction the polyketone product is recovered as by filtration or decantation. The polyketone polymer may contain residues of the catalyst composition which are removed, if desired, by treatment with a solvent or a complexing agent which is selective for the residues.

The polyacetal polymer employed as the minor component in the blends of the invention is a polyoxyalkylene polymer, which is at least predominantly a polyoxymethylene polymer, illustratively produced by polymerization of formaldehyde, provided as such or from a formaldehyde source, and optionally polymerized therewith a small proportion of a second compound such as a low molecular weight cyclic ether which is not a formaldehyde source. One preferred formaldehyde source is 1,3,5-trioxane which is viewed as a formaldehyde trimer. The cyclic ether which is preferred as an optional comonomer of the polyacetal polymer is a low molecular weight cyclic ether of up to 10 carbon atoms inclusive and up to 2 oxygen atoms inclusive. One class of such cyclic ethers is the group of compounds known as oxirane compounds or olefin oxides having two carbon atoms and one oxygen atom in a cyclic three-membered ring. Such olefin oxides have up to 10 carbon atoms inclusive and are suitably hydrocarbon olefin oxides such as ethylene oxide, propylene oxide, 2-butylene oxide and 1-octene oxide or are halohydrocarbon olefin oxides, preferably chlorohydrocarbon olefin oxides such as epichlorohydrin. Other cyclic ethers of one oxygen but more than two carbon atoms in the ring are the polymethylene oxides including hydrocarbon polymethylene oxides such as trimethylene oxide, tetramethylene oxide and pentamethylene oxide as well as halohydrocarbon, preferably chlorohydrocarbon, polymethylene oxides such as 2,2-di(chloromethyl)trimethylene oxide. Cyclic ethers of more than one oxygen in the ring include 1,3-dioxolane and 1,4-dioxane.

The acetal resin prepared from formaldehyde has a high molecular weight and a structure typified by the following:

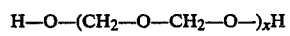

H—O—(CH$_2$—O—CH$_2$—O—)$_x$H where terminal groups are derived from controlled amounts of water and the x denotes a large (typically 1500) number of formaldehyde units linked in head-to-tail fashion. To increase thermal and chemical resistance, terminal groups are typically converted to esters or ethers.

Also included in the term polyacetal resins are the polyacetal copolymers, such as those listed in British Pat. No. 807,589 (Du Pont), which include other monomers capable of providing active hydrogens, such as alkylene glycols, polythiols, vinyl acetate—acrylic acid copolymers, or reduced butadiene/acrylonitrile polymers.

Preferred polyacetal polymers comprise at least 85 mole percent, preferably at least 90 mole percent, based on total polyacetal polymer of polyoxymethylene, the unit derived from formaldehyde, with an optional amount of no more than 15 mole percent, preferably no more than 10 mole percent, based on total polyacetal polymer, of a cyclic ether polymerized with the polyoxyalkylene. Although block copolymers of formaldehyde are known wherein a polyoxymethylene block is attached to a block of a second polymerized monomer, e.g., the cyclic ether, the preferred polyacetal polymers when copolymers are employed are the more typical random copolymers wherein the monomers are copolymerized and the moieties of cyclic ether occur randomly throughout the polymer chain. Although such copolymers are suitable for the blends of the invention it is generally preferred to use homopolymers of formaldehyde without any substantial amount of comonomer.

Such preferred polyacetal polymers, are represented by the repeating formula

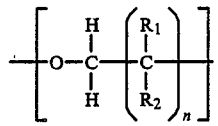

wherein each $R_1$ and $R_2$ is hydrogen, alkyl of up to 4 carbon atoms inclusive, or haloalkyl of up to 4 carbon atoms and 2 halogens inclusive, preferably haloalkyl of up to 1 halogen wherein the halogen is chloro, and n is an integer from 0 to 3 inclusive, with n being 0 in at least 85% of the repeating units. These polyacetal polymers are produced by polymerizing at least 85 mole percent of formaldehyde with up to 15 mole percent, based on total polyacetal polymer, of the cyclic ether of the formula

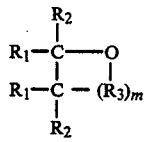

wherein each $R_1$ and $R_2$ has the previously stated significance, $R_3$ is methylene, oxymethylene, alkyl on haloalkyl substituted methylene, or alkyl or haloalkyl substituted oxymethylene, and m is an integer from 0 to 3 inclusive. Illustrative cyclic ethers are described above. Preferred cyclic ethers for copolymerization with formaldehyde when copolymer polyacetal polymers are employed are ethylene oxide and 1,3-dioxolane. Certain of the preferred formaldehyde/ethylene oxide copolymers are commercially available and are marketed by Celanese under the tradename CELCON ® Polyacetal. Other polyacetal homopolymers and copolymers are available from DuPont under the tradename DELRIN ® Polyacetal.

The polyacetal polymers are produced by polymerization of formaldehyde and, optionally, up to 15 mole percent of the cyclic ether comonomer in the presence of a Friedel Crafts catalyst, preferably complexed with an electron rich molecule. The Friedel Crafts catalysts are metal halides having acidic properties. This class of catalysts include the halides but preferably the fluorides or chlorides of boron, aluminum, iron, tin and other metals as is known in the art. The catalysts are often provided as a complex of an electron rich oxygen compound such as an ether but complexes with an alkanol or an alkanoic acid are also suitable. The production of polyacetal polymers is well known in the art and is taught by Bartz, U.S. Pat. Nos. 2,947,727 and 2,947,728, by Berardinelli, U.S. Pat. No. 3,072,609 and by Walling, U.S. Pat. No. 3,027,352.

The blends of the invention are predominantly polyketone polymer with a lesser quantity of the polyacetal polymer. The precise percentage of the polyacetal polymer in the blend is not critical and percentages of the polyacetal from about 0.5% by weight to about 45% by weight, based on the total blend, are satisfactory with quantities from about 1% by weight to about 15% by weight on the same basis being preferred.

The method of blending the polyketone and the polyacetal is not material so long as a uniform mixture of the two components is obtained without undue degradation of the components or the resulting blend. In one modification the components are blended in a corotating twin-screw extruder. In an alternate modification, the components are blended in a mixing device which exhibits high shear. The polyketone-polyacetal blends of the invention are non-miscible blends having improved properties when compared to the polyketone polymer. The polyacetal exists as a discrete phase within the polyketone matrix with a phase size on the order of from about 0.2 micron to about 0.9 micron, more generally on the order of 0.7 micron. In certain cases, the polyacetal phase may be extended by inclusion of polyketone polymer, typically about 0.2 micron in maximum diameter, providing an overall blend structure similar to a high impact polystyrene. The blend is accordingly non-homogeneous, but satisfactory blends are obtained when the polyacetal phase is uniformly distributed through the polyketone matrix.

The blends of the invention may also contain conventional additives and stabilizers, fillers and fire retardant materials, mold release agents, colorants and other materials which are designed to improve the processability of the blend or its components or to improve the properties of the resulting blend. Such additives are incorporated within the blend or blend components prior to, together with or subsequent to the blending of the polyketone or polyacetal polymer.

The presence of a discrete phase of polyacetal of rather small size within the polyketone matrix infers good interfacial adhesion between the dispersed polyacetal phase and the polyketone matrix. The blends show an improved impact resistance. The blends are of particular utility in instances where molded parts are desired which exhibit strength when exposed to conditions of elevated temperatures. The blends are processed by conventional methods, such as extrusion or injection molding, into sheets, plates, films and molded objects. The blends find particular utility in the production of both internal and external parts for the automotive industry and structural parts for application in the construction industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced by contacting the monomers in the presence of a catalyst composition formed from palladium acetates, the anion of trifluoroacetic acid and 1,3-bis(diphenylphosphino)propane. The melting point of the terpolymer was 225° C. and the polymer had a limiting viscosity number (LVN) of 1.7, measured at 60° C. in m-cresol. Approximately 0.2% by weight, based on total blend, of Irganox 1076, a commercial phenolic antioxidant, was added to the terpolymer at a processing temperature of 240° C.

ILLUSTRATIVE EMBODIMENT II

A blend of the polyketone polymer of Illustrative Embodiment I and 11.2% by weight of CELCON ® polyacetal polymer, was produced in a 15 mm twin screw Baker Perkins extruder. The extruder was operated at 240° C. using undried feed and under a nitrogen blanket. The extruder was operated at maximum RPM and the extruded strand was passed directly into water. The feed rate was such as to produce maximum torque and the residence time was 0.5 minutes.

Examination of a cold cut sample of the blend, stained with ruthenium tetraoxide, showed that the polyacetal polymer was dispersed within a polyketone matrix. The phase size of the dispersed polyacetal was approximately 0.7 microns with good interfacial adhesion. Within substantially each polyacetal dispersion was an inclusion of polyketone of approximately 0.2 micron in diameter.

ILLUSTRATIVE EMBODIMENT III

A linear alternating terpolymer of carbon monoxide, ethylene and propylene was produced by contacting the monomers in the presence of a catalyst composition formed from palladium acetates, the anion of trifluoroacetic acid and 1,3-bis[di(2-methoxyphenyl)phosphino]propane. The melting point of the terpolymer was 196° C. and the polymer had a limiting viscosity number (LVN) of 1.68, measured at 60° C. in m-cresol. Appoximately 0.5% by weight, based on total blend, of A0330, a commercial antioxidant, was added to the terpolymer at a processing temperature of 220° C.

ILLUSTRATIVE EMBODIMENT IV

A blend of the polyketone polymer of Illustrative Embodiment III and 20% by weight of CELCON® M90 polyacetal polymer, was produced in a 15 mm twin screw Baker Perkins extruder. The extruder was operated at 220° C. using undried feed and under a nitrogen blanket. The extruder was operated at maximum RPM and the extruded strand was passed directly into water. The feed rate was such as to produce maximum torque and the residence time was 0.5 minutes.

The blended polymer exhibited increased impact strength versus the low molecular weight base terpolymer of Illustrative Emboidment III as evidenced by the center cut Notched Izod impact data presented in Table I.

TABLE I

| CELCON ® M90 (% by Weight) | Notched Izod - Rm Temp. (FT. LB/IN) |
| --- | --- |
| 0 | 1.7 |
| 20 | 2.3 |

What is claimed is:

1. A composition comprising a non-miscible blend of a linear alternating polymer of carbon monoxide and at least one ethylenically unsaturated hydrocarbon and a polyacetal polymer of at least 85 mole percent, based on total blend, of polymerized formaldehyde.

2. The composition of claim 1 wherein the linear alternating polymer is represented by the formula

wherein D is a moiety of an ethylenically unsaturated hydrocarbon of at least three carbon atoms, polymerized through the ethylenic unsaturation, and the ratio of y:x is no more than about 0.5 and the blend is from about 0.5% by weight to about 35% by weight, based on total blend, of the polyacetal polymer.

3. The composition of claim 2 wherein the polyacetal polymer is represented by the formula

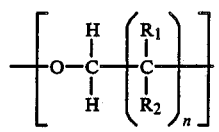

wherein each $R_1$ and $R_2$ is hydrogen, alkyl of up to 4 carbon atoms inclusive, or haloalkyl of up to 4 carbon atoms, and n is an integer from 0 to 3 inclusive with n being 0 in at least 85% of the repeating units.

4. The composition of claim 3 wherein D is the moiety of propylene.

5. The composition of claim 4 wherein the polyacetal polymer is at least 85 mole percent of polymerized formaldehyde and up to 15 mole percent of ethylene oxide or 1,3-dioxolane copolymerized therewith.

6. The composition of claim 5 wherein the polyacetal polymer is at least 85 mole percent polymerized formaldehyde and up to 15 mole percent of ethylene oxide copolymerized therewith.

7. The composition of claim 5 wherein y=0.

8. The composition of claim 5 wherein the ratio of y:x is from about 0.01 to about 0.1.

9. The composition of claim 8 wherein the polyacetal polymer is at least 85 mole percent of polymerized formaldehyde and up to 15 mole percent ethylene oxide copolymerized therewith.

* * * * *